UNITED STATES PATENT OFFICE.

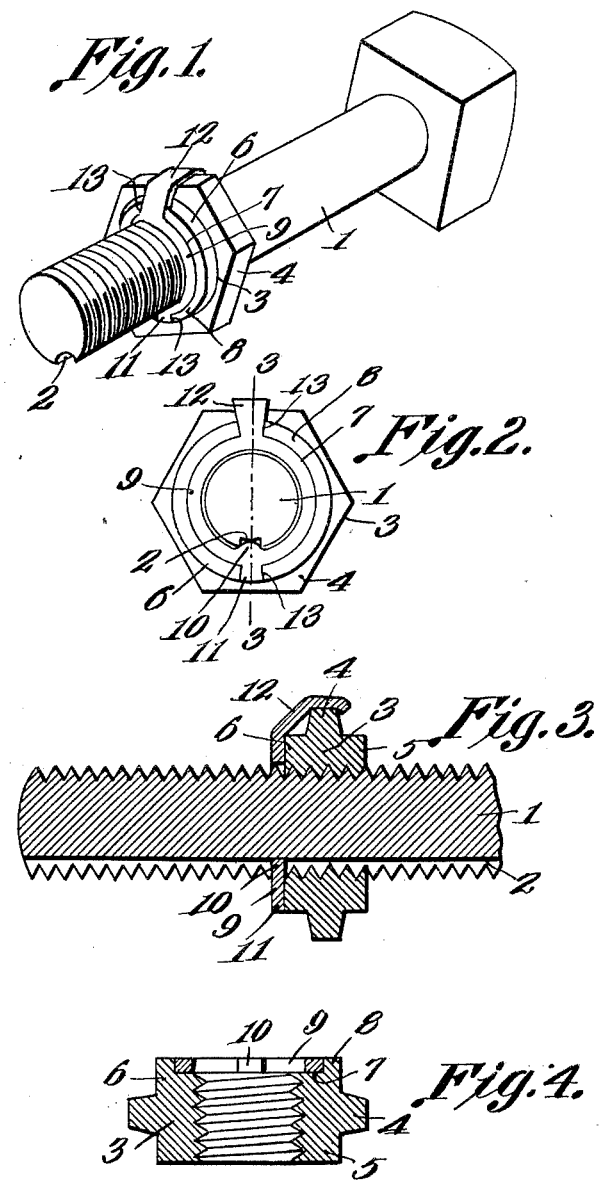

THURSTON MATHENY, OF THE PLAINS, OHIO.

NUT-LOCK.

1,098,454. Specification of Letters Patent. Patented June 2, 1914.

Application filed May 12, 1913, Serial No. 767,241. Renewed April 17, 1914. Serial No. 832,636.

*To all whom it may concern:*

Be it known that I, THURSTON MATHENY, a citizen of the United States, residing at The Plains, in the county of Athens and State of Ohio, have invented a new and useful Nut-Lock, of which the following is a specification.

The present invention appertains to nut locks, and aims to provide a novel and improved device of that character, which shall also be simple, compact and inexpensive in construction, as well as efficient, serviceable and convenient in its use.

With the foregoing and other objects in view, which will be apparent as the description proceeds, the present invention resides in the combination and arrangement of parts and in the details of construction hereinafter described and claimed, it being understood that changes in the precise embodiment of the invention can be made within the scope of what is claimed without departing from the spirit of the invention.

The invention has been illustrated in its preferred embodiment in the accompanying drawing, wherein:—

Figure 1 is a perspective view of the device. Fig. 2 is an end view. Fig. 3 is a longitudinal section taken on the line 3—3 of Fig. 2. Fig. 4 is a sectional view of the nut and washer, the section being taken on a plane at right angles to the plane of section of Fig. 3.

Referring specifically to the drawing, the numeral 1 designates an ordinary bolt having a longitudinal groove or channel 2, it being understood that the present nut and locking washer may be applied to various bolts, as will be apparent.

The nut employed may be of any suitable type, the same being designated by the numeral 3, and in the present instance having a central hexagonal or wrench engaging portion 4 and bosses 5 and 6 at the respective sides of the hexagonal or wrench engaging portion 4.

The boss 6 at the outer face of the nut is provided with an inner rabbet or socket 7 forming an annular flange 8, a suitable washer 9 being seatable within the rabbet or socket 7 flush with the flange 8 and having an inwardly projecting lug or tooth 10 adapted to engage the groove or channel 2 of the bolt so as to lock the washer from turning on the bolt. The washer is also provided with the diametrically opposite extensions 11 and 12, which are adapted to fit in notches or slots 13 cut in the flange 8 flush with the rabbet or socket 7, the extension 11 being relatively short or in the form of a lug, while the extension 12 is relatively long and flared. The extension or tail 12 is of such a length, that the free end thereof may be bent over the hexagonal or enlarged portion 4, to lock the washer in position with respect to the nut.

In use, the nut may be applied to the bolt in the usual manner, and after the nut has been screwed to position, the washer may be inserted over the end of the bolt and then engage within the rabbet or cavity 7 with the extensions 11 and 12 engaging within the notches 13. The tail or extension 12 is adapted to be bent over the hexagonal or wrench engaging portion 4, the free end or tip of the tail or finger 12 being bent back of the portion 4 so as to lock the washer against displacement, it being noted that the extensions 11 and 12 in engaging within the notches 13 prevent the nut from rotating with respect to the washer. It is to be observed that the washer fits within the rabbet 7 flush with the face of the boss 6, so that the washer may be assembled with the nut prior to the application of the nut to the bolt, the washer, however, being removed so as to permit the nut to be threaded onto the bolt, after which, the washer may be secured in position. The nut may be released at any time, by bending the tail or finger 12 out of engagement with the wrench engaging portion 4, which will permit the nut to be unscrewed and removed.

From the foregoing, the advantages and capabilities of the present invention will be apparent, it being noted that the objects have been carried out satisfactorily, and that the present device provides a desirable one for the purposes for which it is designed.

What is claimed as new is:—

1. In combination with a nut having a central enlargement and a cavity in one face forming a flange, the flange having a notch, a washer fitting in the said cavity and having an extension fitting in the said notch, the extension being adapted to be bent around the enlarged portion of the nut, and the washer having a lug to engage the groove of a bolt.

2. In combination with a nut having a central enlargement and a cavity in one face forming a rib, the rib having diametrically opposite notches, a washer fitting in the said cavity and having diametrically opposite extensions fitting in the notches, one of the extensions being elongated in order that its free end may be bent around the said enlargement, and the washer having a lug to engage the groove of a bolt.

3. In combination with a nut having a central enlargement for the engagement of a wrench and having bosses at its opposite faces, one of the bosses having an inner rabbet forming a flange, the flange having diametrically opposite notches, a washer fitting in the rabbet and having diametrically opposite extensions fitting in the notches, one of the extensions being elongated in order that its free end may be bent over the said enlargement, the washer being provided with a lug to enter the groove of a bolt.

In testimony that I claim the foregoing as my own, I have hereto affixed my signature in the presence of two witnesses.

THURSTON MATHENY.

Witnessses:
JOSEPH EVANS,
EDWARD HARDY.

---

Copies of this patent may be obtained for five cents each, by addressing the "Commissioner of Patents, Washington, D. C."